April 30, 1929.  H. J. KRATZER  1,711,097

METHOD OF STERILIZING SUBSTANCES

Filed Aug. 19, 1927

Inventor
H. J. Kratzer
By Watson E. Coleman

Patented Apr. 30, 1929.

1,711,097

UNITED STATES PATENT OFFICE.

HERBERT J. KRATZER, OF ST. LOUIS, MISSOURI.

METHOD OF STERILIZING SUBSTANCES.

Application filed August 19, 1927. Serial No. 214,132.

This invention relates to a method of sterilizing substances and has for an important object thereof the provision of a method of sterilization, preventing alteration either of the taste or chemical constituents of the substance.

A further object of the invention is to produce a method of sterilization which is not critical in its operation and in which oversterilization causing the production of an inferior product is impossible.

A further and more specific object of the invention is the sterilization of substances by rupturing the cell walls of micro-organisms contained therein.

This result I obtain by first subjecting the substance to a pressure considerably in excess of atmospheric pressure and permitting it to remain at this pressure for a time sufficient to cause the excess pressure gases to permeate the cell envelope. The cell is then suddenly subjected to a very much reduced pressure, with the result that the contained gases of the cell envelope suddenly expand, rupturing the same and killing the cell. In the treatment of liquids, the process set forth is supplemented by an aeration of the liquids during the application of pressure thereto and by the subjection of the liquids to impact and agitation as it is subjected to the reduced pressure.

I have illustrated apparatus suitable for carrying out this process in the accompanying drawings, in which:—

Figure 1:
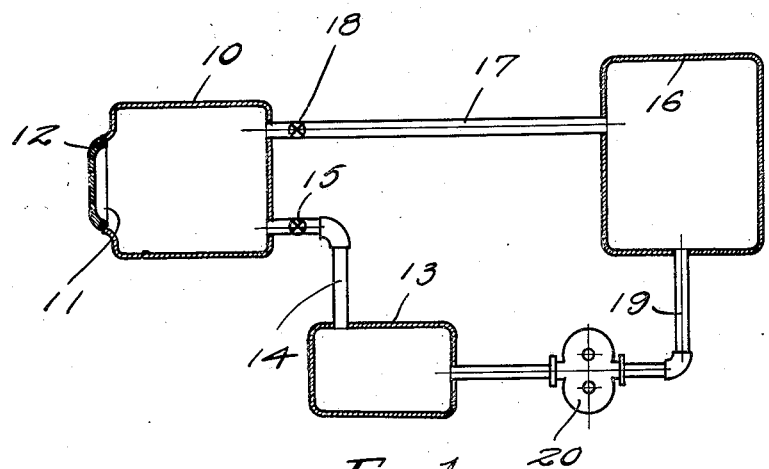
Figure 1 is a diagrammatic view of apparatus suitable for use in the treatment of plastic substances.

Referring now to the drawings and more particularly to Figure 1 thereof, the numeral 10 designates a chamber for the reception of the substance to be treated having an opening 11 through which the substance may be inserted, which is closed by a gasketed cover 12. The chamber 10 is in communication with a relatively small pressure chamber 13 through a conduit 14 containing a valve 15 and with a relatively large vacuum chamber 16 through a conduit 17 containing a valve 18. The pressure chamber 13 and vacuum chamber 16 are in communication through a conduit 19 having a pump 20 arranged therein.

In the operation of the structure just described, the substance to be sterilized is placed in the chamber 10, the valve 18 being closed and the valve 15 being left open. The pump 20 is placed in operation with the result that the contents of the chamber 16 are evacuated into the pressure chamber 13 and escape through the conduit 15 to the receiving chamber 10, causing an increase in pressure above atmospheric therein. After a suitable period during which the increased pressure acts to cause the gas to permeate the cells of micro-organisms contained in the substance being treated, the valve 18 is suddenly opened and the valve 15 simultaneously closed. Due to relative pressures in the chambers 16 and 10, a rapid decrease in pressure takes place in the chamber 10 and as the pump 20 continues in operation, there is a continual exhaust of gas from the chamber 16 and a constant building-up of pressure in the chamber 13, continuing the decrease of pressure in the chamber 10. Due to the rapid release of the pressure surrounding the cells in chamber 10, the absorbed gases contained within cells at a substantial pressure, rapidly expand, thereby rupturing the cell envelope. After a suitable period, the positions of the valves 18 and 15 may be again reversed, continuing the cycle until it is certain that all cells including those developing from bacteria spores into living organisms between pressure periods have been exterminated.

It will be obvious that the gases contained in the apparatus will, of themselves, be sterile and will remain so when the apparatus is shut down. Upon stopping of the pump, it will also be obvious that by opening the valves 18 and 15, the gases contained in the chambers will equalize and since their original pressure was that of the atmosphere, there will be no tendency to any leakage in the system, introducing fresh air and its accompanying micro-organisms to the system.

Figure 2:
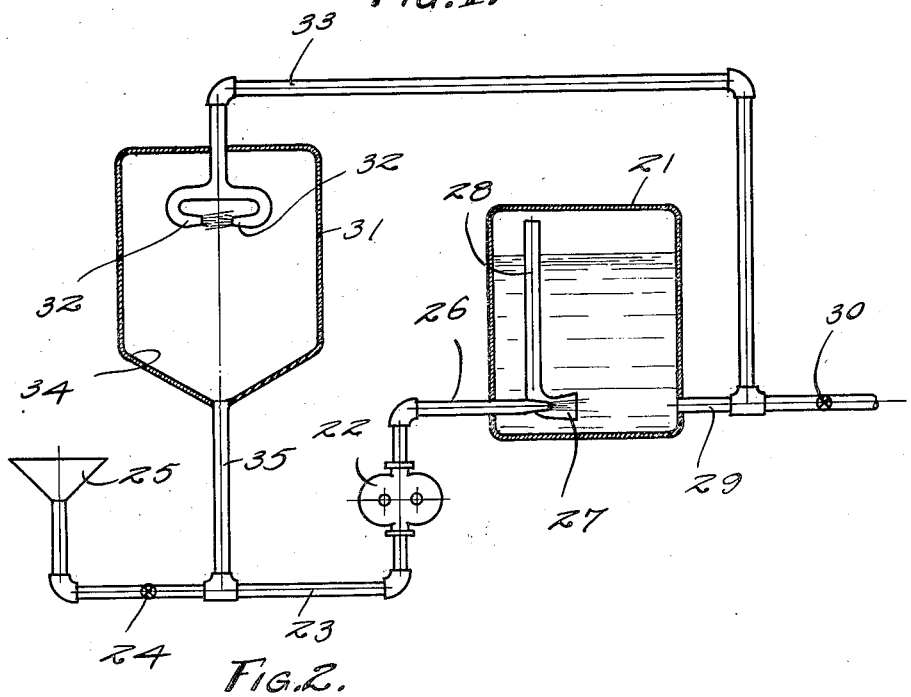
Figure 2 is a similar view of apparatus suitable for the treatment of liquids.

In Figure 2, 21 designates a pressure chamber, 22 a pump for delivering liquids and gases to the chamber and 23 the intake line for the pump having arranged intermediate its ends a valve 24 and at its inlet end an open container 25 for the introduction of liquids to the intake. The exhaust 26 of the pump preferably discharges into the pressure chamber 21 at a point adjacent the bottom thereof and through the outlet 27 of an aspirator 28, the inlet of which is preferably immediately adjacent the upper wall of the chamber 21. The chamber 21 has an outlet 29 which communicates with the chamber adjacent the bottom thereof and is provided with a valve 30.

This outlet may communicate directly with the inlet 23 of the second pressure chamber of a series of which the pressure chamber 21 forms the first. Under these circumstances, the valve 30 serves the function of the valve 24.

The numeral 31 designates a vacuum chamber having in its upper end opposed jet nozzles 32 communicating with a conduit 33 which in turn communicates with the outlet 29 between the chamber 21 and valve 30. The lower end of the vacuum chamber is preferably hopper-bottomed, as indicated at 34, and communicates through a conduit 35 with the inlet 23 of the pump between the valve 24 and the pump. The jet nozzles 32 are of such size that they will not permit passage of liquids and gases in an amount corresponding to the volumetric capacity of the pump 22, so that with the valve 24 closed, there will be a constant formation of vacuum in the chamber 31.

In the use of the apparatus just described, the valves 24 and 30 are first opened to be sure that all parts of the apparatus are filled with air at atmospheric pressure and after this is accomplished, the pump 22 is started and the valve 30 closed. The fluid which is to be sterilized is introduced to the hopper 25, which is at a higher level than the pump 22, with the result that the pump forces the liquid into the chamber 21. As the level of the liquid rises in the chamber 21, the outlet 29 is submerged with the result that since the conduit 33 extends above the level of the top of the chamber 21, the liquid traps in the chamber a certain percentage of the air contained in the system and prevents escape of this air. As no air can now escape from the chamber 21 to the chamber 31, air will be drawn from the chamber 31 by the pump together with the liquid from the hopper 25 and will intermingle with this liquid to pass through the jet of the outlet of the pump at the aspirator mouth. This jet has a tendency to draw the air from the upper portion of the chamber 21 and further intermingle it with the incoming fluid, with the result that the fluid entering the chamber 21 is thoroughly aerated. The portion of the air aerating the fluid will combine therewith in proportion to the pressure of the fluid and the remaining air will rise to the top of the chamber 21, where it will exist as compressed air in the space 36 above the liquid. When a sufficient volume of liquid has been introduced to the pressure chamber 21, the valve 24 is closed, with the result that a further decrease in pressure occurs in the chamber 31 and the liquid is drawn from the chamber 21, passing through the pipe 33 and nozzles 32. As is well known, liquids occlude gases in direct ratio to the gas pressure existing and accordingly if the contents of the chamber 21 are under an absolute pressure of seventy-five pounds, the liquid will absorb approximately five times as much as it ordinarily absorbs or approximately one-half the volume of the liquid, so that for each gallon of aerated fluid passing through the nozzles 32, one-half gallon by volume of air at atmospheric pressure passes therethrough. Immediately upon passing the throats of the opposed nozzles, the liquid streams being suddenly subjected to the reduced pressure of the chamber 31 will release the absorbed gases and permit the gases entrained in the cell structures to "bloat" and weaken the cell organisms. At substantially the same time, the opposing jets impinge on one another, thereby subjecting all contained matter in the jets to turbulence, impact and abrasion sufficient to disrupt organic cells which have not been ruptured by the sudden reduction in pressure and further emulsify and homogenize inorganic matter. While the illustration merely diagrams the arrangement of apparatus suitable for batch or single charge sterilization, wherein the charge is left in the closed system a sufficient length of time to insure a complete sterilization, it is obvious that as indicated above, a continuously operating system may be employed by placing two or more sterilizing units, such as shown, in series.

I claim:—

1. A method of sterilizing substances consisting in circulating the substance in a closed system having a pressure area wherein a pressure of approximately seventy-five pounds absolute is maintained and a vacuum area having a pressure below atmospheric to which the substance is alternately subjected and aerating the substance while in the pressure area.

2. A method of sterilizing substances consisting in circulating the substance in a closed system having a pressure area wherein a pressure of approximately seventy-five pounds absolute is maintained and a vacuum area having a pressure below atmospheric to which the substance is alternately subjected and introducing the substance to the vacuum area from the pressure area in a manner agitating the same.

3. A method of sterilizing substances consisting in circulating the substance in a closed system having a pressure area wherein a pressure of approximately seventy-five pounds absolute is maintained and a vacuum area having a pressure below atmospheric to which the substance is alternately subjected, aerating the substance while in the pressure area, and introducing the substance to the vacuum area from the pressure area in a manner agitating the same.

In testimony whereof I hereunto affix my signature.

HERBERT J. KRATZER.